United States Patent
An et al.

(10) Patent No.: US 12,514,810 B2
(45) Date of Patent: Jan. 6, 2026

(54) SKIN EXTERNAL COMPOSITION COMPRISING CROSSLINKED HYALURONIC ACID GEL

(71) Applicant: AMOREPACIFIC CORPORATION, Seoul (KR)

(72) Inventors: Hyoseok An, Yongin-si (KR); Hyuk Kim, Yongin-si (KR); Seunghan Park, Yongin-si (KR); Sungyeon Cho, Yongin-si (KR)

(73) Assignee: AMOREPACIFIC CORPORATION, Seoul (KR)

( * ) Notice: Subject to any disclaimer, the term of this patent is extended or adjusted under 35 U.S.C. 154(b) by 39 days.

(21) Appl. No.: 18/149,718

(22) Filed: Jan. 4, 2023

(65) Prior Publication Data

US 2023/0218500 A1 Jul. 13, 2023

(30) Foreign Application Priority Data

Jan. 13, 2022 (KR) .................. 10-2022-0005472

(51) Int. Cl.
*A61K 8/73* (2006.01)
*A61K 8/06* (2006.01)
*A61Q 19/00* (2006.01)

(52) U.S. Cl.
CPC .............. *A61K 8/735* (2013.01); *A61K 8/062* (2013.01); *A61Q 19/007* (2013.01); *A61K 2800/412* (2013.01); *A61K 2800/95* (2013.01)

(58) Field of Classification Search
CPC ....... A61Q 19/007; A61K 8/062; A61K 8/735
See application file for complete search history.

(56) References Cited

U.S. PATENT DOCUMENTS

2021/0022981 A1   1/2021   Cho et al.

FOREIGN PATENT DOCUMENTS

| CN | 109806182 A | * | 5/2019 | ............... A61K 8/73 |
| JP | 2009-137850 A | | 6/2009 | |
| KR | 10-2018-0070308 A | | 6/2018 | |
| KR | 102015857 B1 | * | 8/2019 | ............. A61K 8/735 |
| KR | 10-2020-0070125 A | | 6/2020 | |
| KR | 20200070125 A | * | 6/2020 | ................ C08J 3/12 |
| KR | 10-2143829 B1 | | 8/2020 | |
| KR | 102203168 B1 | * | 1/2021 | ............... A61K 8/41 |

OTHER PUBLICATIONS

NSS Staff, "5 sorbet-texture beauty products to try this week", Jul. 20, 2020, G-Club, pp. 1-11 (Year: 2020).*
Kulkarni, C. V. "Lipid self-assemblies and nanostructured emulsions for cosmetic formulations", Oct. 31, 2016, Cosmetics, 3, 1-15 (Year: 2016).*
Olejnik, A. et al., Stability determination of the formulations containing hyaluronic acid, Feb. 2015, vol. 37, 401-407 (Year: 2015).*
Monticelli, D. et al., Chemical characterization of hydrogels crosslinked with polyethylene glycol for soft tissue augmentation, Apr. 15, 2019, Open Access Macedonian Journal of Medical Sciences, vol. 7, 1077-1081 (Year: 2019).*
Ahuja, A. et al., Rheological predictions of sensory attributes of lotions, Mar. 25, 2019, Journal of Texture Studies, vol. 50, 295-305 (Year: 2019).*
Shimojo, A.A.M et al., The crosslinking degree controls the mechanical, rheological, and swelling properties of hyaluronic acid microparticles, May 15, 2014, Journal of Biomedical Materials Research, vol. 103, 730-737 (Year: 2014).*
Anonymous, "Cetearyl Alcohol", INCI Decoder, 2025, https://incidecoder.com/ingredients/cetearyl-alcohol, accessed Feb. 25, 2025 (Year: 2025).*
Anonymous, "Polyglyceryl-3 Methylglucose Distearate", INCI Decoder, 2025, https://incidecoder.com/ingredients/polyglyceryl-3-methylglucose-distearate, accessed Feb. 25, 2025 (Year: 2025).*
Anonymous, "Glyceryl Stearate Citrate", INCI Decoder, 2025, https://incidecoder.com/ingredients/glyceryl-stearate-citrate, accessed Feb. 25, 2025 (Year: 2025).*
Anonymous, "Hydroxyethyl Acrylate/Sodium Acryloyldimethyl Taurate Copolymer", INCI Decoder, 2025, https://incidecoder.com/ingredients/hydroxyethyl-acrylate-sodium-acryloyldimethyl-taurate-copolymer, accessed Feb. 25, 2025 (Year: 2025).*
Olejnik et al., "Stability determination of the formulations containing hyaluronic acid", International Journal of Cosmetic Science, 2015, 37, pp. 401-407.
Extended European Search Report issued in EP Application No. 23150432.5 dated Jun. 20, 2023, 10 pgs.

* cited by examiner

*Primary Examiner* — Craig D Ricci
*Assistant Examiner* — Paul Hoerner
(74) *Attorney, Agent, or Firm* — Rothwell, Figg, Ernst & Manbeck, P.C.

(57) ABSTRACT

The disclosure describes an oil-in-water composition for skin external application using a gel of crosslinked hyaluronic acid or a salt thereof and having a sherbet-like texture and feeling of use. The composition of the disclosure comprises the gel particles of crosslinked hyaluronic acid or a salt thereof and emulsion particle having a specific particle size distribution of D(0.5) in an aqueous phase and an oil phase, respectively, so that the composition has a particulate feeling such as sherbet, mashed potato or meringue while having a fluffy appearance or texture, and also provides a refreshing feeling of use when applied, and is easy to clean by comprising the aqueous phase as an outer phase.

11 Claims, 10 Drawing Sheets

SKIN EXTERNAL COMPOSITION COMPRISING CROSSLINKED HYALURONIC ACID GEL

CROSS REFERENCE TO RELATED APPLICATION

The present application claims priority to Korean Patent Application No. 10-2022-0005472, filed Jan. 13, 2022, the entire contents of which is incorporated herein for all purposes by this reference.

BACKGROUND OF THE INVENTION

Field of the Invention

The specification describes an oil-in-water composition having a unique texture comprising a natural polymer hydrogel.

Description of the Related Art

In products such as cosmetics that are applied to the skin and used, the feeling of use is one of the factors that determine customer satisfaction along with the function or efficacy of a product. Accordingly, products exhibiting various feeling of use have been developed. A representative specific feeling of use of cosmetics is a water busting feeling or a feeling of moisture, but this feeling of use has a limitation in that it can be provided only when a discontinuous phase is an aqueous phase, such as water in oil (W/O) or water in silicon oil (W/S) emulsion. In the case of these formulations, because an outer phase is oil or silicone oil, the initial shine is severe, or the property called water busting, due to a phase transfer feeling, that is, a phenomenon in which the inner phase and the outer phase are reversed and the water busting of the inner phase is felt, occurs discontinuously. Thus, it is easy to give a stiff feeling when applied. In addition, the oil component of the outer phase remains on the skin and gives a feeling that only the water component is on the surface, and the oil or silicone oil component of the outer phase may irritate the skin and remains on the skin, making it difficult to clean.

SUMMARY OF THE INVENTION

In one aspect, the object to be achieved by the disclosure is to provide an oil-in-water composition having a unique feeling of use.

In order to achieve the above object, an embodiment of the disclosure provides an oil-in-water composition for skin external application, comprising a gel particle of crosslinked hyaluronic acid or a salt thereof having a particle size distribution with D (0.5) of 30 to 150 μm in an aqueous phase, and an emulsion particle having a particle size distribution with D(0.5) of 0.001 to 30 μm in an oil phase.

The specification describes an oil-in-water composition for skin external application using a gel of crosslinked hyaluronic acid or a salt thereof and having a sherbet-like texture and feeling of use. The composition of the disclosure comprises the gel particles of crosslinked hyaluronic acid or a salt thereof and emulsion particle having a specific particle size distribution of D(0.5) in an aqueous phase and an oil phase, respectively, so that the composition has a particulate feeling such as sherbet, mashed potato or meringue while having a fluffy appearance or texture. The composition of the disclosure can provide a refreshing feeling of use that is spread smoothly as if it melts when applied, and at the same time, a feeling of oil when the emulsion particles burst and a feeling of moisture when the gel particles burst are continuously felt, and it is easy to clean by comprising the aqueous phase as an outer layer. In addition, unlike conventional products using crosslinked hyaluronic acid materials that are accompanied by stickiness due to viscosity, the composition of the disclosure is less sticky after absorption and can provide moisture for a long time even though it contains a high content of crosslinked hyaluronic acid.

DETAILED DESCRIPTION OF THE INVENTION

Figure 1:
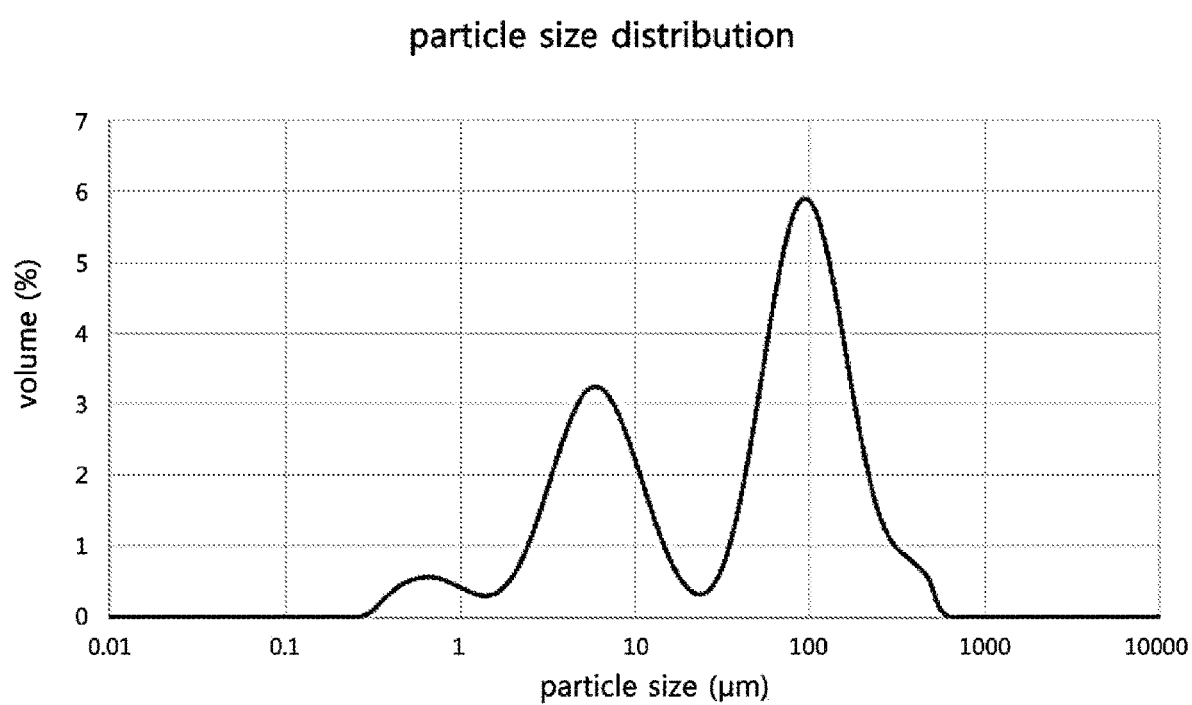
FIG. 1 is a diagram showing the particle size distribution of Example 1, which is an embodiment of the disclosure.
Figure 2:
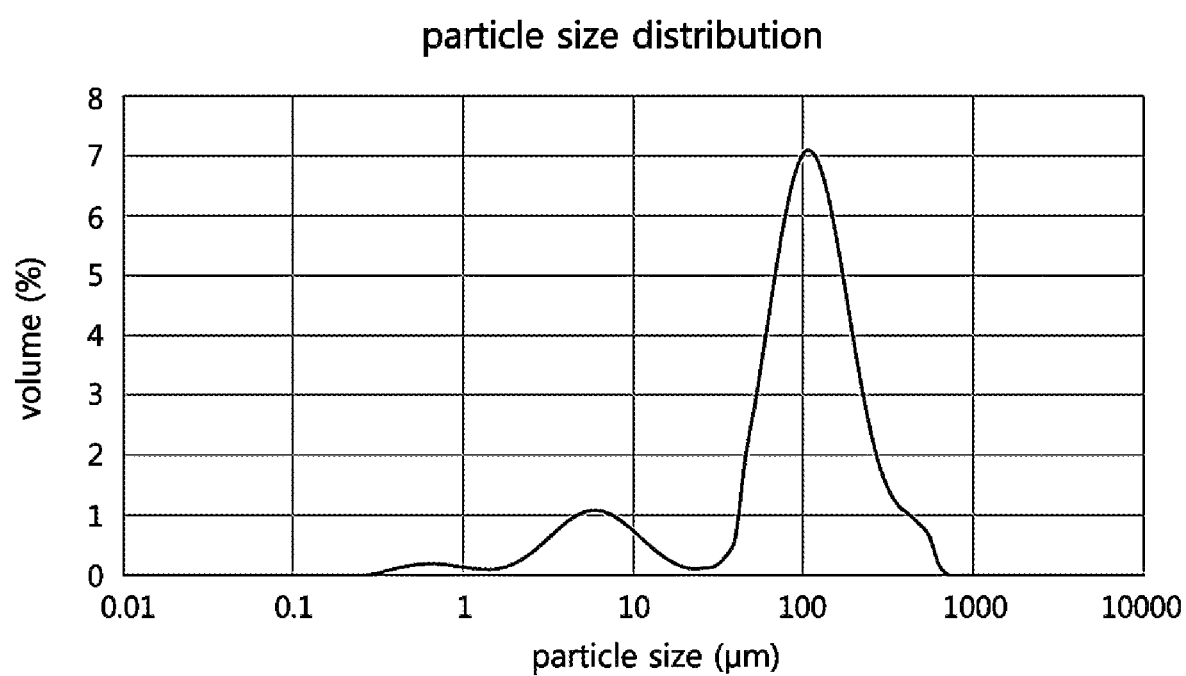
FIG. 2 is a diagram showing the particle size distribution of Example 2, which is an embodiment of the disclosure.
Figure 3:
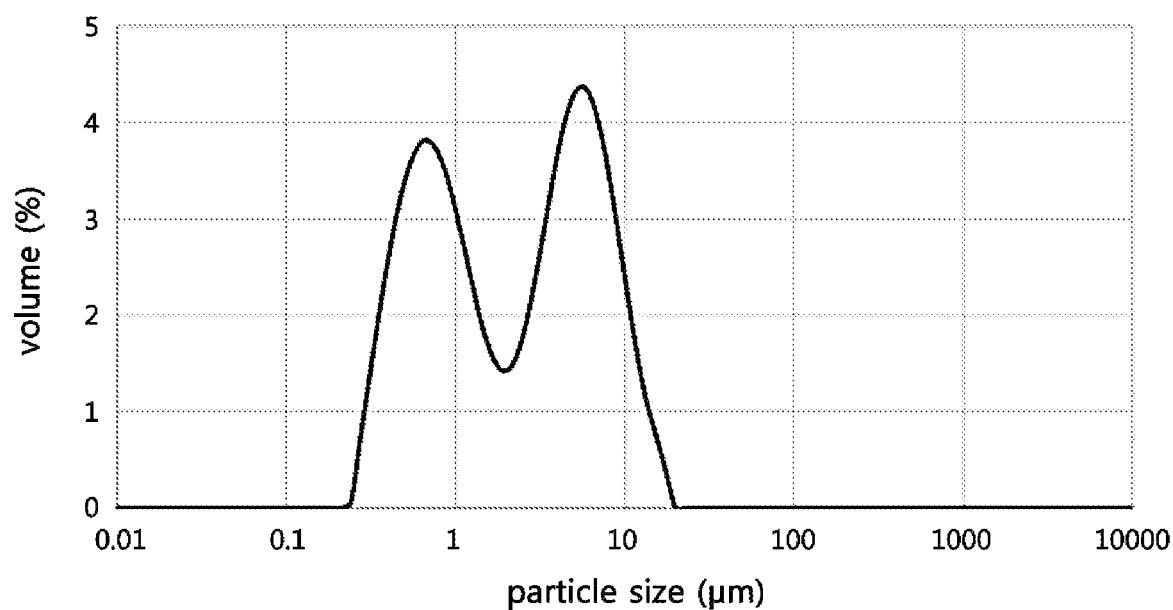
FIG. 3 is a diagram showing the particle size distribution of Comparative Example 1.
Figure 4:
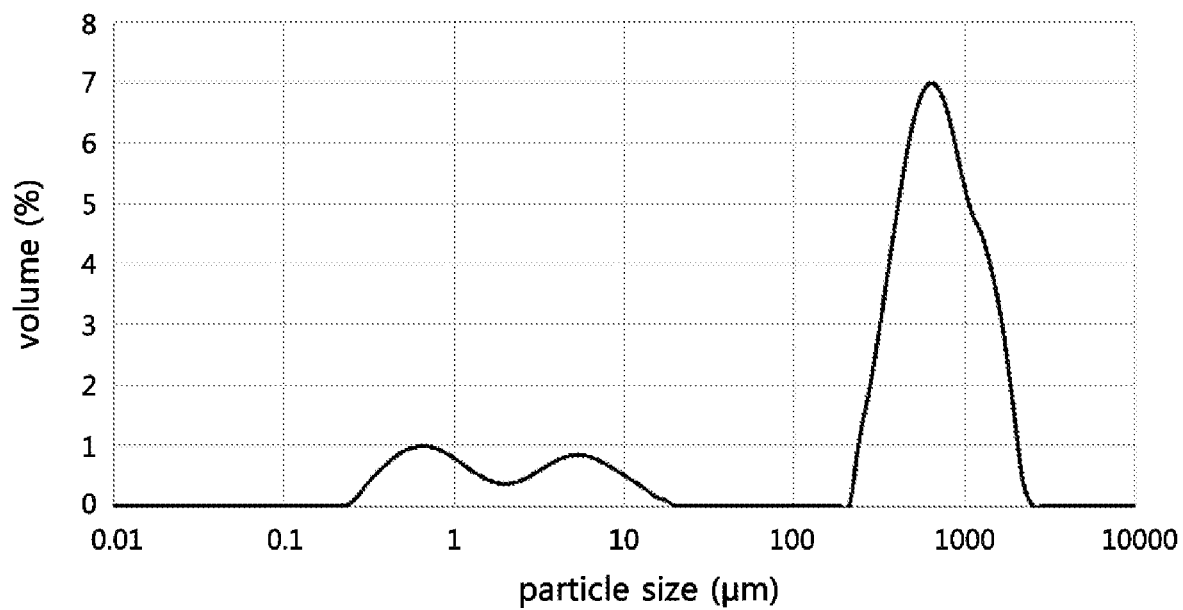
FIG. 4 is a diagram showing the particle size distribution of Comparative Example 2.

Embodiments of the disclosure now will be described more fully hereinafter with reference to the accompanying drawings. This disclosure may, however, be embodied in many different forms and should not be construed as limited to the exemplary embodiments set forth therein. Rather, these embodiments are provided so that this disclosure will be thorough and complete, and will fully convey the scope of the disclosure to those skilled in the art. In addition, those skilled in the art may implement the spirit of this disclosure in various other forms without departing from the technical spirit of this disclosure.

The singular forms used in the present specification include the plural forms, unless the context clearly indicates otherwise. In the disclosure, it will be appreciated that terms "comprising", "including", "containing", "having", or the like is intended to designate the existence of characteristics, numbers, steps, operations, components described in the specification or a combination thereof, and do not exclude a possibility of the existence or addition of one or more other characteristics, numbers, steps, operations, components, or a combination thereof in advance.

One embodiment of the disclosure provides an oil-in-water composition for skin external application, comprising a gel particle of crosslinked hyaluronic acid or a salt thereof having a particle size distribution with D(0.5) of 30 to 150

μm in an aqueous phase, an emulsion particle having a particle size distribution with D(0.5) of 0.001 to 30 μm in an oil phase.

In the disclosure, the 'composition for skin external application' is a composition of a formulation applied externally to the skin, and may be applied directly by hand or using various application means such as a spatula, and may comprise various formulations of cosmetics, pharmaceuticals, quasi-drugs, and the like.

In the disclosure, hyaluronic acid is a linear anionic natural polysaccharide in which β-D-N-acetylglucosamine and β-D-glucuronic acid are alternately bonded, and is present in the form of a salt. The molecular structure of hyaluronic acid may be represented by Formula 1 below.

[Formula 1]

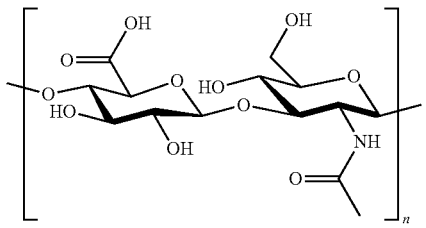

Here, the n is 200 to 25,000, and the unit of the x is mol.

In one embodiment of the disclosure, the salt is not particularly limited, but may be an acid addition salt, a base addition salt, or an amino acid salt. For example, the salt may comprise an inorganic acid salt such as hydrochloride, hydrobromide, sulfate, hydroiodide, nitrate, and phosphate; an organic acid salt such as citrate, oxalate, acetate, formate, propionate, benzoate, trifluoroacetate, maleate, tartrate, methanesulfonate, benzenesulfonate, and p-toluenesulfonate; an inorganic base salt such as sodium salt, potassium salt, calcium salt, magnesium salt, copper salt, zinc salt, aluminum salt, and ammonium salt; an organic base salt such as triethylammonium salt, triethanolammonium salt, pyridinium salt, and diisopropylammonium salt; an amino acid salt such as lysine salt, arginine salt, histidine salt, aspartate, and glutamate. In one embodiment, the salt may comprise hyaluronic acid sodium salt, hyaluronic acid potassium salt, hyaluronic acid acetate, hyaluronic acid ammonium salt or $C_{12-13}$ alkyl glyceryl hydrolyzed hyaluronate. In the disclosure, the weight average molecular weight of the polymeric hyaluronic acid or a salt thereof varies depending on the length of a sugar chain. As an example, the weight average molecular weight of the polymeric hyaluronic acid or a salt thereof may be 100 to 5,000 kDa. Specifically, the weight average molecular weight of the polymeric hyaluronic acid or a salt thereof may be 100 kDa or more, 300 kDa or more, 500 kDa or more, 700 kDa or more, 900 kDa or more, 1,100 kDa or more, 1,300 kDa or more, 1,400 kDa or more, 1,500 kDa or more, or 1,600 kDa or more, and 5,000 kDa or less, 4,000 kDa or less, 3,000 kDa or less, 2,700 kDa or less, 2,400 kDa or less, 2,100 kDa or less, 1,800 kDa or less, 1,700 kDa or less, 1,600 kDa or less, 1,500 kDa or less, or 1,400 kDa or less. More specifically, the weight average molecular weight of the polymeric hyaluronic acid or a salt thereof may be 1,300 to 1,800 kDa.

Natural hyaluronic acid has poor structural stability and is easily decomposed and removed from the body. Accordingly, an embodiment of the disclosure comprises gel particles of the crosslinked hyaluronic acid or a salt thereof, and the crosslinking of the hyaluronic acid or a salt thereof is not limited to a crosslinking method as long as the gel particles having the particle size distribution of the disclosure can be prepared.

As an example, the crosslinked hyaluronic acid or a salt thereof may be chemically crosslinked by a crosslinking agent. Specifically, the crosslinking agent may be at least one of a sulfone-based crosslinking agent, an epoxide-based crosslinking agent, and a phosphate-based crosslinking agent, but is not limited thereto. For example, the crosslinking agent may be at least one selected from the group consisting of divinyl sulfone (DVS), 1,4-butanediol diglycidyl ether (BDDE), ethylene glycol diglycidyl ether (EGDGE), 1-(2,3-epoxypropyl)-2,3-epoxycyclohexane, polyethylene glycol diglycidyl ether (PEGDE), 1,2-ethanediol diglycidyl ether, and sodium trimetaphosphate (STMP).

As an example, the composition may comprise gel particles of crosslinked hyaluronic acid or a salt thereof having the particle size distribution of D(0.5) of 30 to 150 μm in an aqueous phase. In this case, the particle size distribution is a ratio of the particle group of a certain particle size range to the total particle group expressed as a percentage, and this is the particle size distribution curve shown in the figure. The D(0.5) is also referred to as D50, D(V, 0.5) or the median particle size. The D (0.5) means the size of particles distributed in the median 50% of the particle size distribution chart, and appears as a peak on the distribution chart. As one embodiment, the 30 to 150 μm may mean a size of at least 50%, 60%, 70%, 80% or 90% of the particles comprised in the composition. That is, the range is a value of D(0.5), D(0.6), D(0.7), D(0.8) or D(0.9). As an embodiment, the particle size distribution can be measured using a Mastersizer 2000 from Malvern Panalytical, which is a particle size analyzer of a ray diffraction method, but as long as it is a particle size analyzer capable of measuring particle size distribution, the method or type of the particle size analyzer is not limited.

Specifically, the gel particles of the crosslinked hyaluronic acid or a salt thereof may have a D(0.5) of 30 μm or more, 40 μm or more, 50 μm or more, 60 μm or more, 70 μm or more, 80 μm or more, 85 μm or more, 90 μm or more, 95 μm or more, 100 μm or more, 105 μm or more, 110 μm or more, 120 μm or more, 130 μm or more, 140 μm or more, or 150 μm or less, and 140 μm or less, 130 μm or less, 120 μm or less, 115 μm or less, 110 μm or less, 105 μm or less, 100 μm or less, 95 μm or less, 90 μm or less, 80 μm or less, 70 μm or less, 60 μm or less, 50 μm or less, or 40 μm or less in the particle size distribution. If the D (0.5) value in the particle size distribution of the gel particles is less than 30 μm, a refreshing feeling of water bursting during application may be insignificant. If the D (0.5) value of the gel particles exceeds 150 μm, the particles are excessively large, so a soft texture such as sherbet is not expressed, and a feeling of foreign matter may be felt and the feeling of use may be deteriorated.

As an embodiment, as long as the gel particles of the crosslinked hyaluronic acid or a salt thereof can be prepared with a particle size within the above size range, the method is not limited. For example, the gel particles may be prepared by preparing a gel by crosslinking hyaluronic acid or a salt thereof, and then passing the gel through a mesh and pulverizing the gel, and the size of the particles can be adjusted according to the size of the mesh.

As an embodiment, the composition may comprise emulsion particles having a particle size distribution of D (0.5) of 0.001 to 30 μm in an oil phase. In the disclosure, the term 'emulsion particle' is distinguished from the 'gel particle of crosslinked hyaluronic acid or a salt thereof" and refers to oily particle dispersed in the aqueous phase of the composition. As an embodiment, D (0.5) of the emulsion particles may appear as a single peak or a plurality of peaks depending on the preparation method of the composition and the type and content of components comprised in the composition. Specifically, the emulsion particles may have a D(0.5) of 0.001 µm or more, 0.01 µm or more, 0.1 µm or more, 0.5 µm or more, 1 µm or more, 2 µm or more, 3 µm or more, 4 µm or more, 5 µm or more, 6 µm or more, 7 µm or more, 8 µm or more, 9 µm or more, 10 µm or more, 11 µm or more, 12 µm or more, 13 µm or more, 14 µm or more, 15 µm or more, 20 µm or more or 25 µm or more, and 30 µm or less, 29 µm or less, 28 µm or less, 27 µm or less, 25 µm or less, 24 µm or less, 23 µm or less, 22 µm or less, 21 µm or less, 20 µm or less, 19 µm or less, 18 µm or less, 17 µm or less, 16 µm or less, 15 µm or less, 14 µm or less, 13 µm or less, 12 µm or less, 11 µm or less, 10 µm or less, 9 µm or less, 8 µm or less, 7 µm or less, 5 µm or less, 1 µm or less, 0.5 µm or less, 0.1 µm or less, or 0.001 µm or less in the particle size distribution. If the D (0.5) value in the particle size distribution of the emulsion particles is less than 0.001 µm, it is difficult to manufacture the composition because it must be accompanied by a nanoemulsion manufacturing process such as high-pressure emulsification, and if the D (0.5) value exceeds 30 µm, formulation stability may be reduced.

Conventional compositions in the form of the gel of crosslinked hyaluronic acid or a salt thereof have been problematic in many cases accompanied by stickiness. However, since the composition according to an embodiment of the disclosure comprises particles within a specific particle size distribution range by pulverizing the gel of crosslinked hyaluronic acid or a salt thereof, the disclosure can provide a composition that is not sticky even if it comprises a high content of hyaluronic acid and has excellent moisture and absorption rate.

As an embodiment, the type of oil comprised in the emulsion particles is not limited as long as it is a commonly used oil in the art. In one embodiment, the oil may be an ester-based oil, a hydrocarbon-based oil, a natural oil, a silicone-based oil, and the like. Specifically, the oil may comprise at least one selected from the group consisting of polydecene, hydrogenated polydecene, polybutene, hydrogenated polyisobutene, dicaprylyl carbonate, diisostearylmalate, butylene glycol dicaprylate/dicaprate, cetyl 2-ethyl hexanoate, triethylhexanoin, caprylic/capric triglyceride, dicetearyl dimer dilinoleate, diisostearyl malate, dicetearyl dimer dilinoleate, hexyl laurate, pentaerythrityl tetraethylhexanoate, pentaerythrityl tetraisostearate, octyldodecyl stearoyl stearate, cyclopentasiloxane, cyclohexasiloxane, dimethicone, methyl trimethicone, cyclomethicone, phenyl trimethicone, squalane, tamanu oil, macadamia nut oil, sunflower seed oil, olive oil, evening primrose oil, argan oil, apricot oil, sesame oil, orange oil, rosewood oil, bergamot oil, *camellia* oil, tea tree oil, and jojoba oil.

As an embodiment of the disclosure, the composition may have a sherbet-like texture and appearance. In this case, the 'sherbet' may mean a state in which the composition is applied to a glass plate as if pushed and the appearance is identified to have a particle feeling. For example, it may mean a state having soft and fluffy physical properties similar to light and soft foam (see FIG. 5). As an embodiment, the disclosure has a sherbet-like texture and appearance, and even when used, it spreads smoothly as if melting like a sherbet, and the moisture feeling when the gel particles burst and the oil feeling when the emulsion particles burst may be continuously felt.

As an embodiment, the gel of hyaluronic acid or a salt thereof may be comprised in an amount of 0.01 to 20% by weight based on a total weight of the composition. Specifically, the content of the gel of hyaluronic acid or a salt thereof may be comprised in an amount of 0.01% by weight or more, 0.05% by weight or more, 0.1% by weight or more, 0.2% by weight or more, 0.3% by weight or more, 0.4% by weight or more, 0.5% by weight or more, 0.6% by weight or more, 0.7% by weight or more, 0.8% by weight or more, 0.9% by weight or more, 1% by weight or more, 1.5% by weight or more, 2% by weight or more, 2.5% by weight or more, 3% by weight or more, 3.5% by weight or more, 4% by weight or more, 4.5% by weight or more, 5% by weight or more, 6% by weight or more, 7% by weight or more, 8% by weight or more, 9% by weight or more, 10% by weight or more, 11% by weight or more, 12% by weight or more, 13% by weight or more, 14% by weight or more, 15% by weight or more or 19% by weight or more, and 20% by weight or less, 19% by weight or less, 18% by weight or less, 17% by weight or less, 16% by weight or less, 15% by weight or less, 14% by weight or less, 13% by weight or less, 12% by weight or less, 11% by weight or less, 10% by weight or less, 9% by weight or less, 8% by weight or less, 7% by weight or less, 6% by weight or less, 5% by weight or less, 4% by weight or less, 3% by weight or less, 2% by weight or less, 1% by weight or less, or 0.5% by weight or less, based on the total weight of the composition. As an embodiment, the gel of hyaluronic acid or a salt thereof may be comprised in an amount of 0.01 to 5% by weight in dry weight based on the total weight of the composition. Specifically, the content of the gel of hyaluronic acid or a salt thereof may be comprised in an amount of 0.01% by weight or more, 0.05% by weight or more, 0.1% by weight or more, 0.2% by weight or more, 0.3% by weight or more, 0.4% by weight or more, 0.5% by weight or more, 0.6% by weight or more, 0.7% by weight or more, 0.8% by weight or more, 0.9% by weight or more, 1% by weight or more, 1.1% by weight or more, 1.3% by weight or more, 1.5% by weight or more, 1.7% by weight or more, 2% by weight or more, 2.2% by weight or more, 2.4% by weight or more, 2.6% by weight or more or 2.8% by weight or more, and 5% by weight or less, 4% by weight or less, 3% by weight or less, 2.5% by weight or less, 2% by weight or less, 1.7% by weight or less, 1.5% by weight or less, 1.3% by weight or less, 1.1% by weight or less, 1% by weight or less, 0.9% by weight or less, 0.8% by weight or less, 0.7% by weight or less, 0.6% by weight or less, or 0.5% by weight or less, in dry weight based on the total weight of the composition. If the content is out of the range, a specific appearance and texture such as sherbet may not appear.

As an embodiment, the modulus of elasticity (G') of the composition may be adjusted by adjusting the physical properties of the gel of hyaluronic acid or a salt thereof. For example, the elastic modulus (G') of the composition may be 100 to 9000 Pa. More specifically, the elastic modulus may be 100 Pa or more, 200 Pa or more, 300 Pa or more, 400 Pa or more, 500 Pa or more, 600 Pa or more, 700 Pa or more, 800 Pa or more, 900 Pa or more, 1000 Pa or more, 1100 Pa 1200 Pa or more, 1500 Pa or more, 2000 Pa or more, 3000 Pa or more, 4000 Pa or more, 5000 Pa or more, 6000 Pa or more, 7000 Pa or more or 8000 Pa or more, and 9000 Pa or less, 8000 Pa or less, 7000 Pa or less, 6000 Pa or less, 5000 Pa or less, 4000 Pa or less, 3000 Pa or less, 2000 Pa or less, 1900 Pa or less, 1800 Pa or less, 1700 Pa or less, 1600 Pa or less, 1500 Pa or less, 1400 Pa or less, 1300 Pa or less, 1200 Pa or less, 1100 Pa or less, or 1000 Pa or less. If the modulus of elasticity is out of the above range, a formulation with a sherbet-like appearance may not appear because it is too hard or close to liquid.

In one embodiment, the modulus of elasticity may be measured using a rheometer (Maven, USA). Specifically, the elastic modulus is measured in a frequency range of 0.1 to 10 Hz, 1 Pa shear stress, and 1 mm gap using a 20 mm plate corn at 25° C., and the elastic modulus may be the G' value at 1 Hz among the measured values. In this case, the sample for measuring the modulus of elasticity (G') was unified in the form of a disk with a diameter of 20 mm and a thickness of 1 mm.

As an embodiment, the composition may be used for moisturizing the skin.

Another embodiment of the disclosure may provide a method for moisturizing a skin comprising applying an effective amount of an oil-in-water composition for skin external application comprising a gel particle of crosslinked hyaluronic acid or a salt thereof having a particle size distribution with D (0.5) of 30 to 150 µm in an aqueous phase, and an emulsion particle having a particle size distribution with D (0.5) of 0.001 to 30 µm in an oil phase to a skin of a subject in need thereof. Another embodiment may provide a use of an oil-in-water composition comprising a gel particle of crosslinked hyaluronic acid or a salt thereof having a particle size distribution with D (0.5) of 30 to 150 µm in an aqueous phase, and an emulsion particle having a particle size distribution with D (0.5) of 0.001 to 30 µm in an oil phase for preparing a skin external composition for skin moisturizing. Another embodiment may provide an oil-in-water composition comprising a gel particle of crosslinked hyaluronic acid or a salt thereof having a particle size distribution with D (0.5) of 30 to 150 µm in an aqueous phase, and an emulsion particle having a particle size distribution with D (0.5) of 0.001 to 30 µm in an oil phase for use in a skin external composition for skin moisturizing. Another embodiment may provide a non-therapeutic cosmetic use of an oil-in-water composition comprising a gel particle of crosslinked hyaluronic acid or a salt thereof having a particle size distribution with D (0.5) of 30 to 150 µm in an aqueous phase, and an emulsion particle having a particle size distribution with D (0.5) of 0.001 to 30 µm in an oil phase as an active ingredient for skin moisturizing.

According to one aspect, the formulation of the cosmetic composition may have a cosmetically or dermatologically acceptable medium or substrate. The composition may be provided in the form of any formulation suitable for topical application. Examples of the formulations for topical application may comprise solutions, gels, paste anhydrides, oil-in-water emulsions, suspensions, microemulsions, microcapsules, microgranules, ionic (liposome) and/or nonionic vesicular dispersants, cream, skin toner, lotion, ointment, or the like. The composition can be formulated according the methods known in the related art. The cosmetic composition according to an embodiment of the disclosure may be formulated into any forms with no particular limitation, and the cosmetic composition may be formulated into a composition for skin care, a composition for makeup, a composition for body or hair care or cleansing. For example, an embodiment of the disclosure may be formulated into cosmetic products, such as ampoule, cream, skin softener, skin astringent, skin nutrient, nutrient cream, massage cream, essence, eye cream, eye essence, cleansing cream, cleansing foam, cleansing water, cleansing tissue containing the cosmetic composition, pack, body lotion, body cream, body oil and body essence. For example, an embodiment of the disclosure may be formulated into cosmetic products, such as make-up primer, make-up base, foundation, concealer, lipstick, lip gloss, lip balm, powder, lip liner, eyeliner, mascara; eyebrow, eye shadow, blusher, twin cake, UV protector. For example, an embodiment of the disclosure may be formulated into body wash, facial wash, hand wash, hair shampoo, hair rinse, hair conditioner, hair treatment, hair tonic, scalp treatment, dual purpose treatment for hair and scalp, hair lotion, hair cream, hair nourishing lotion, general ointment, or the like.

If the formulation according to an embodiment of the disclosure is any of paste, cream or gel, animal fibers, vegetable fibers, wax, paraffin, starch, tragacanth, cellulose derivatives, polyethylene glycol, silicone, bentonite, silica, talc or zinc oxide may be used as a carrier component. If the formulation according to an embodiment of the disclosure is a solution or emulsion, a solvent, solvate or emulsifier may be used as a carrier component. For example, it may comprise water, ethanol, isopropanol, ethyl carbonate, ethyl acetate, benzyl alcohol, benzyl benzoate, propylene glycol, 1,3-butylglycyl oil, glycerol aliphatic ester, polyethylene glycol or fatty acid ester of sorbitan. If the formulation according to an embodiment of the disclosure is a suspension, a liquid diluent such as water, ethanol or propylene glycol, a suspension such as ethoxylated isostearyl alcohol, polyoxyethylene sorbitol ester and polyoxyethylene sorbitan ester, microcrystalline cellulose, aluminum metahydroxide, bentonite, agar, tragacanth, or the like may be used as a carrier component. If the formulation according to an embodiment of the disclosure is a surfactant-containing cleansing agent, aliphatic alcohol sulfate, aliphatic alcohol ether sulfate, monoester sulfosuccinate, isethionate, imidazolinium derivatives, methyltaurate, sarcosinate, fatty acid amide ether sulfate, alkyl aminobetaine; aliphatic alcohol, fatty acid glyceride, fatty acid diethanolamide, vegetable oil, linoline derivatives or ethoxylated glycerol fatty acid ester may be used as a carrier component.

The cosmetic composition according to an embodiment of the disclosure may additionally comprise a functional additive and an ingredient commonly comprised in a cosmetic composition. The functional additive may comprise an ingredient selected from a group consisting of a water-soluble vitamin, an oil-soluble vitamin, a polypeptide, a polysaccharide, a sphingolipid, and a seaweed extract. In addition, a lipid component, a humectant, an emollient, a surfactant, an organic or inorganic pigment, an organic powder, a UV absorbent, an antiseptic, a sterilizer, an antioxidant, a plant extract, a pH control agent, an alcohol, a colorant, a flavor, a blood circulation promoter; a cooling agent, an antiperspirant, purified water, etc. may be further contained.

In one embodiment, the composition may be a pharmaceutical composition.

When the composition according to an embodiment of the disclosure is used for medicine, it may be formulated into semisolid or liquid parenteral administration forms by adding a commonly used inorganic or organic carrier to the active ingredient used in an embodiment of the disclosure. The composition according to an embodiment of the disclosure may be easily formulated with the active ingredients according a commonly used method known in the art. In this case, a surfactant, an excipient, a colorant, a flavor, a preservative, a stabilizer, a buffer, a suspension, or other commonly used additives may be used adequately. The dose of the active ingredient of the pharmaceutical composition according to an embodiment of the disclosure may vary depending on the age, sex, and body weight of a subject in need of treatment, particular disease or condition to be treated, severity of the disease or condition, administration route, or the prescriber's decision. The determination of the administration dose considering these factors will be easily understood by those skilled in the art. The daily administration dose of the composition may be, for example, 0.1 mg/kg/day to 100 mg/kg/day, more specifically 5 mg/kg/day to 50 mg/kg/day, but is not limited thereto.

Hereinafter, the disclosure will be described in further detail with reference to below examples. It is to be understood, however, that these examples are for illustrative purposes only and are not intended to limit the scope and range of the disclosure.

PREPARATION EXAMPLE

Example 1

As an example of the disclosure, Example 1 having the composition shown in Table 1 below was prepared by the following method.

Specifically, sodium hyaluronate (manufacturer: Hyundai Bioland) was mixed with a solution containing a crosslinking agent (PEGDE, manufacturer: Sigma) and NaOH to crosslink the hyaluronate to prepare a gel-type crosslinked product. The gel-type crosslinked product was passed through a mesh net and pulverized to prepare particles having the D (0.5) of 30 to 150 µm in the particle size distribution. Example 1 was prepared by adding and mixing the pulverized hyaluronate gel particles into an oil-in-water composition prepared according to a commonly used method of those skilled in the art.

Example 2

As an embodiment of the disclosure, Example 2 was prepared in the same manner as in Example 1, except that BDDE (manufacturer: Sigma) was used as the crosslinking agent.

Comparative Example 1

Comparative Example 1 was prepared in the same manner as in Example 1, except that uncrosslinked sodium hyaluronate (manufacturer: Hyundai Bioland) was used instead of the pulverized hyaluronate gel particles.

Comparative Example 2

Comparative Example 2 was prepared in the same manner as in Example 1, except that the particle size distribution of the pulverized hyaluronate gel exceeded 150 µm.

Experimental Example 1

In the experiment below, the particle size distribution of each of Example 1, Example 2, Comparative Example 1, and Comparative Example 2 prepared above was measured, and the appearance and feeling of use were compared accordingly.

First, the particle size distribution of each composition was measured using a Mastersizer 2000 from Malvern Panalytical, and the results were shown in FIGS. 1 to 4, respectively. As a result, both Examples 1 and 2 and Comparative Examples 1 and 2 showed peaks (D(0.5)) of the emulsion particles in the range of 0.1 to 20 µm, and Examples 1 and 2 and Comparative Example 2, except for Comparative Example 1 containing uncrosslinked hyaluronate, showed the peak of the crosslinked hyaluronate gel particles, in addition to the peak of the emulsion particles. Specifically, Examples 1 and 2 had D (0.5) values in the 100 µm region, and Comparative Example 2 had D (0.5) values exceeding 150 µm.

Then, each composition was applied thinly to a glass plate as if pushed, and the appearance according to the particle size distribution value of the crosslinked hyaluronate gel particles was photographed vertically from top to bottom to identify the appearance. In addition, the feeling of use was identified by taking about 0.3 ml of each composition and placing it on the back of the hand and then applying the composition for about 20 seconds under the condition of rolling twice per second.

Figure 5:
FIG. 5 is a diagram showing a photograph of the appearance of Example 1, which is an embodiment of the disclosure.
Figure 6:
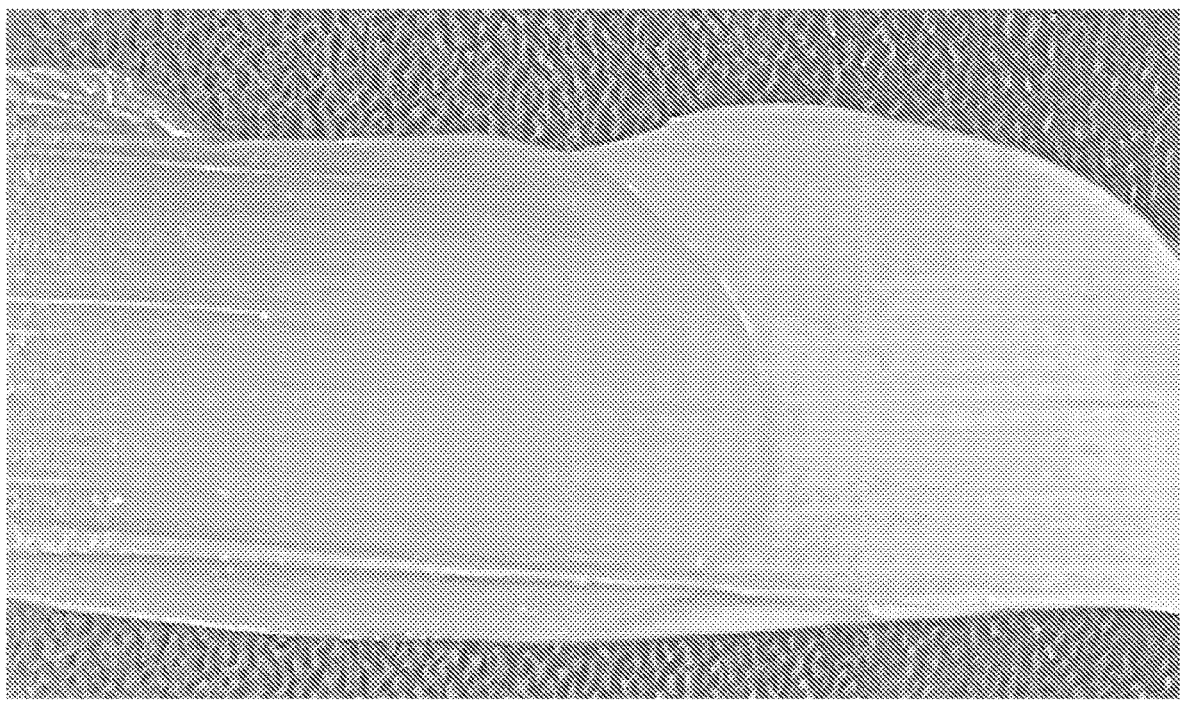
FIG. 6 is a diagram showing a photograph of the appearance of Comparative Example 1.
Figure 7:
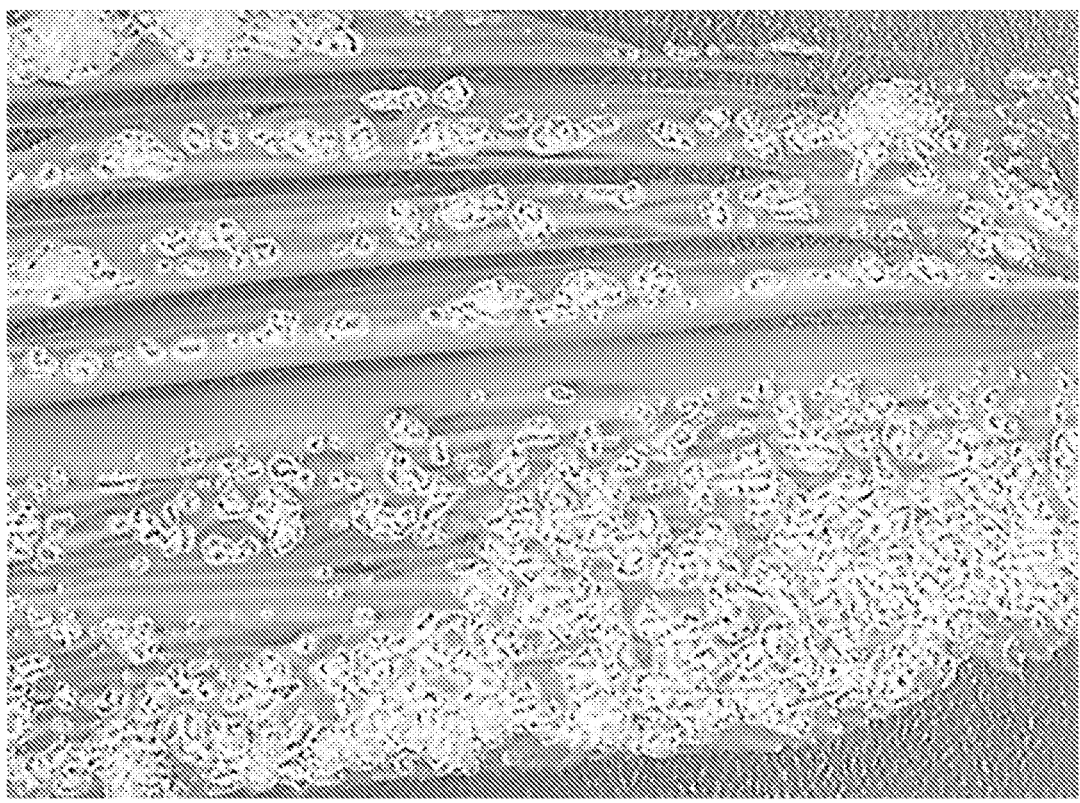
FIG. 7 is a diagram showing a photograph of the appearance of Comparative Example 2.

As a result, as shown in Table 2 below and FIGS. 5 to 7, in the case of Example 1 (FIG. 5) and Example 2, the emulsion particles and the crosslinked hyaluronate gel particles were well mixed, resulting in a fluffy appearance and a water-busting feeling. On the other hand, in the case of Comparative Example 1 (FIG. 6), there were no gel particles, so it showed a smooth surface state and no water busting feeling. In the case of Comparative Example 2 (FIG. 7), the size of the gel particles was excessively large, and the emulsion particles and the gel particles were not well mixed. Thus, during application of the composition, the gel particles were not naturally bursted and the water was not released, and it was confirmed that the gel particles were pushed sideways and were frequently separated from the application range.

TABLE 1

| | Example 1 | Example 2 | Comparative Example 1 | Comparative Example 2 |
|---|---|---|---|---|
| CETEARYL ALCOHOL | 1.5 | 1.5 | 1.5 | 1.5 |
| POLYGLYCERYL-3 METHYLGLUCOSE DISTEARATE | 1 | 1 | 1 | 1 |
| GLYCERYL STEARATE CITRATE | 2 | 2 | 2 | 2 |
| SQUALANE | 8 | 8 | 8 | 8 |
| CETYL ETHYLHEXANOATE | 7 | 7 | 7 | 7 |
| SHEA BUTTER | 3 | 3 | 3 | 3 |
| METHYL TRIMETHICONE | 1.5 | 1.5 | 1.5 | 1.5 |
| DISODIUM EDTA | 0.05 | 0.05 | 0.05 | 0.05 |
| PROPANEDIOL | 14 | 14 | 14 | 14 |
| 1,2-HEXANEDIOL | 1.5 | 1.5 | 1.5 | 1.5 |
| HYDROXYETHYL ACRYLATE/SODIUM ACRYLOYLDIMETHYL TAURATE COPOLYMER | 0.6 | 0.6 | 0.6 | 0.6 |
| Crosslinked HYALURONATE Gel Particles (D(0.5): 30 to 150 µm) | 0.5 | 0.5 | — | — |
| Crosslinked HYALURONATE Gel Particles (D(0.5): greater than 150 µm) | — | — | — | 0.5 |
| Uncrosslinked HYALURONATE | — | — | 0.5 | — |
| WATER | To 100 | To 100 | To 100 | To 100 |

(wt %)

TABLE 2

| Category | D(0.5) | Water busting |
| --- | --- | --- |
| Example 1 | 108 μm | Strong |
| Example 2 | 104 μm | Strong |
| Comparative Example 1 | 4 μm | None |
| Comparative Example 2 | 520 μm | Weak |

Experimental Example 2

The elasticities of the prepared Example 1 and Comparative Example 1 were measured as follows.

The elastic modulus was measured using a rheometer (Maven, USA). In this case, the modulus of elasticity was measured under the setting conditions of plate type: a 20 mm plate corn, at 25° C., the oscillation stress adjusted to 1 Pa, the frequency range of 0.1 to 10 Hz, 1 Pa shear stress, 1 mm gap.

TABLE 3

|  | Example 1 | Comparative Example 1 |
| --- | --- | --- |
| Elastic modulus (G'; Elastic modulus, Pa) | 1068 | 89.45 |

As a result, Example 1 according to an embodiment of the disclosure comprises the gel of hyaluronic acid or a salt thereof having a specific particle distribution size, and thus holds water several tens of times more than its dry weight. Therefore, it can be confirmed that the elastic value of the composition sharply increased when compared to Comparative Example 1 comprising general uncrosslinked hyaluronic acid.

Experimental Example 3

In order to compare the moisturizing abilities of Example 1 and Comparative Example 1 prepared above, a moisture evaporation test for Example and Comparative Example was performed in vitro. Specifically, 4 g of each composition was dispensed into a glass container with a diameter of 3 cm and stored under constant temperature (30° C.), constant humidity (50%) and no wind conditions for 96 hours. The weight of each of the compositions over time was measured, and from this, the amount of moisture remaining after evaporation in each composition, that is, the water content (g) was derived.

Figure 8:
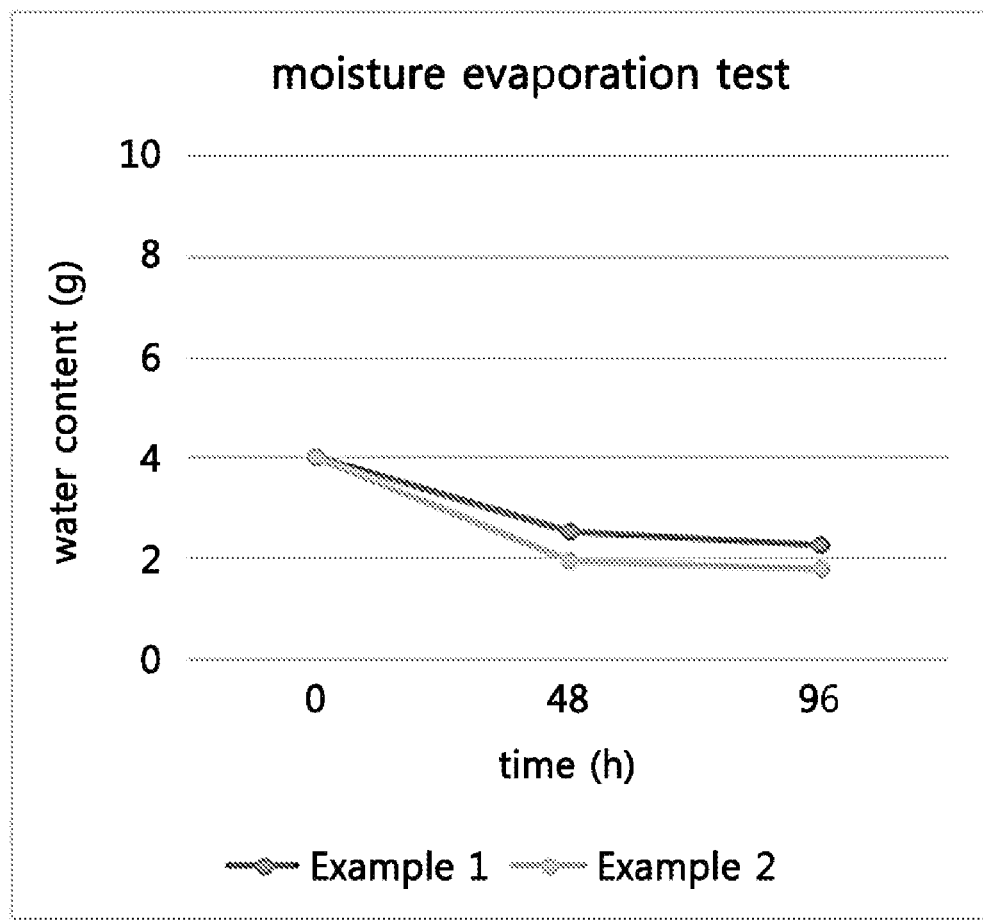
FIG. 8 is a diagram showing the water content change measured over time in Example 1 and Comparative Example 1.

As a result, as shown in FIG. 8, Example 1 had a lower moisture evaporation rate than that of Comparative Example 1, and Comparative Example 1 showed that almost no moisture existed after 48 hours. This means that when the composition of the disclosure is applied to the skin, the feeling of moisture is excellent and the moisture retention capacity will be maintained longer.

Experimental Example 4

Whether or not the prepared Example 1 had a fresh feeling of use without stickiness was compared with Comparative Example 1 and evaluated. Specifically, for three women in their 30s and 40s with general normal skin, 0.3 g of Example 1 was applied to the back of the left hand and 0.3 g of Comparative Example 1 was applied to the back of the right hand, respectively, and then tapped sufficiently to be absorbed. After attaching 20 pieces of paper (double A A4 paper) with a diameter of 5 mm square to the back of each hand, stickiness was evaluated through the number of papers attached when the hand was turned over once. The degree of stickiness was evaluated as 'low stickiness' when the number of attached papers was 0 to 3, 'sticky' when the number of papers was 4 to 7, and 'high stickiness' when the number of papers was 7 or more.

Figure 9:
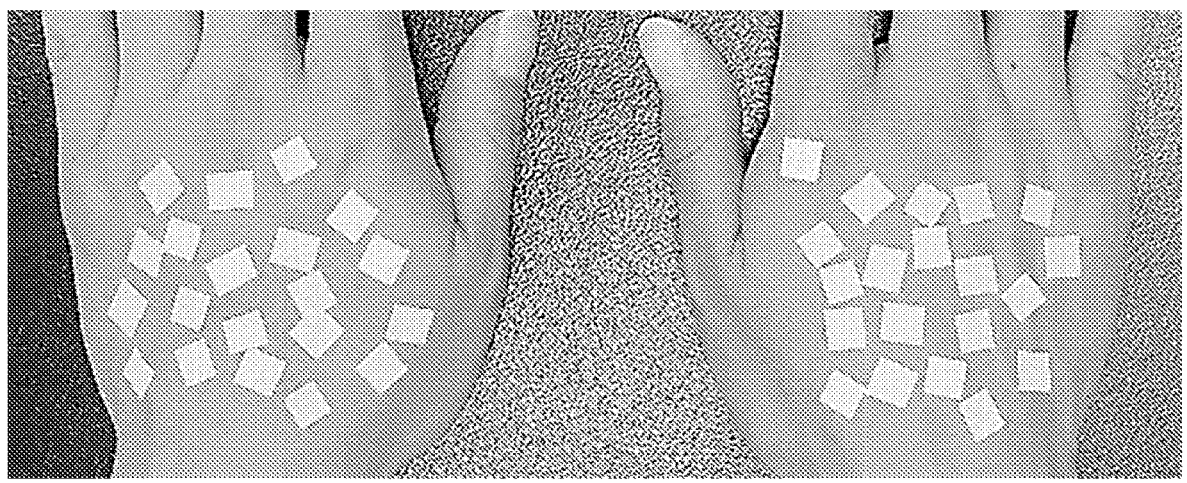
FIG. 9 is a photograph of Example 1 (left hand) and Comparative Example 1 (right hand) before stickiness evaluation.
Figure 10:
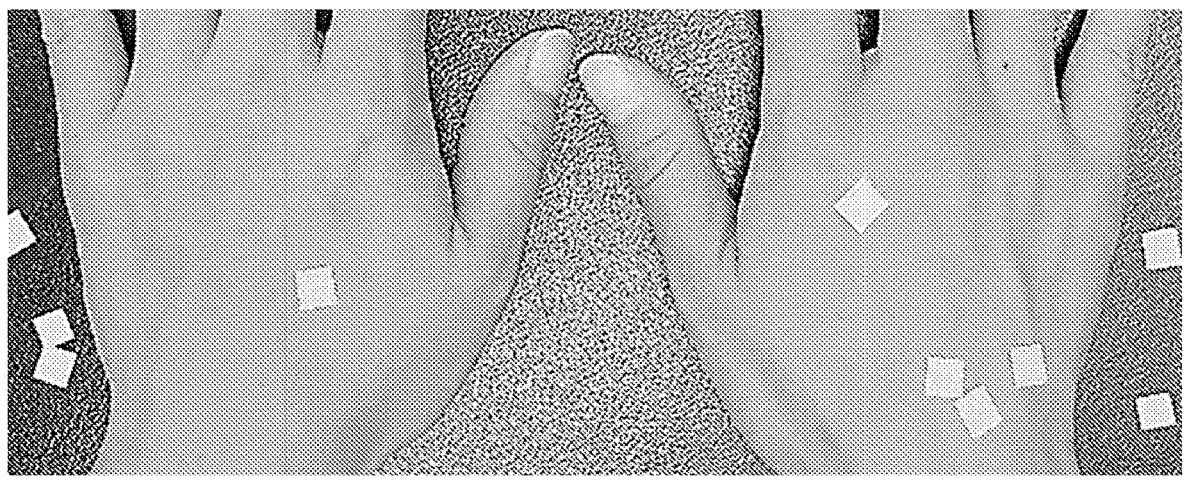
FIG. 10 is a photograph of Example 1 (left hand) and Comparative Example 1 (right hand) after evaluation of stickiness.

As a result, as shown in FIGS. 9 and 10, Example 1 had 1 remaining paper and Comparative Example 1 had 4 remaining papers when the hand was turned over, and thus, it can be confirmed that the stickiness of Example 1 was significantly less, indicating a refreshing feeling of use.

The disclosure may provide the following embodiments as an embodiment.

The first embodiment provides an oil-in-water composition for skin external application, comprising a gel particle of crosslinked hyaluronic acid or a salt thereof having a particle size distribution with D (0.5) of 30 to 150 μm in an aqueous phase, and an emulsion particle having a particle size distribution with D(0.5) of 0.001 to 30 μm in an oil phase.

In the first embodiment, the second embodiment may provide the composition having a sherbet texture.

In the first or second embodiment, the third embodiment may provide the composition in which the emulsion particle has the particle size distribution with the D (0.5) of 0.1 to 10 μm.

In any one of the first to third embodiments, the fourth embodiment may provide the composition in which the crosslinked hyaluronic acid or salt thereof is chemically crosslinked by a crosslinking agent, and the crosslinking agent is at least one of a sulfone-based crosslinking agent, an epoxide-based crosslinking agent, and a phosphate-based crosslinking agent.

In any one of the first to fourth embodiments, the fifth embodiment may provide the composition in which the crosslinking agent is at least one selected from the group consisting of divinyl sulfone (DVS), 1,4-butandiol diglycidyl ether (BDDE), ethylene glycol diglycidyl ether (EGDGE), 1-(2,3-epoxypropyl)-2,3-epoxycyclohexane, polyethylene glycol diglycidyl Ether (PEGDE), 1,2-ethandiol diglycidyl ether, and sodium trimetaphosphate (STMP).

In any one of the first to fifth embodiments, the sixth embodiment may provide the composition in which the crosslinked hyaluronic acid or salt thereof has a weight average molecular weight of 100 to 5,000 kDa.

In any one of the first to sixth embodiments, the seventh embodiment may provide the composition in which the particle size distribution is measured using a Mastersizer 2000 from Malvern.

In any one of the first to seventh embodiments, the eighth embodiment may provide the composition that is for moisturizing a skin.

In any one of the first to eight embodiments, the ninth embodiment may provide the composition that is a cosmetic composition.

In any one of the first to ninth embodiments, the tenth embodiment may provide the composition that is a pharmaceutical composition.

The eleventh embodiment may provide a method for moisturizing a skin, comprising applying an effective amount of an oil-in-water composition for skin external application comprising a gel particle of crosslinked hyaluronic acid or a salt thereof having a particle size distribution of D (0.5) of 30 to 150 μm in an aqueous phase, and an emulsion particle having a particle size distribution of D (0.5) of 0.001 to 30 μm in an oil phase to a skin of a subject in need thereof.

In the eleventh embodiment, the twelfth embodiment may provide the method in which the composition has a sherbet texture.

In the eleventh or twelfth embodiment, the thirteenth embodiment may provide the method in which the emulsion particle has the particle size distribution with the D (0.5) of 0.1 to 10 μm.

In any one of the eleventh to thirteenth embodiments, the fourteenth embodiment may provide the method in which the crosslinked hyaluronic acid or salt thereof is chemically crosslinked by a crosslinking agent, and the crosslinking agent is at least one of a sulfone-based crosslinking agent, an epoxide-based crosslinking agent, and a phosphate-based crosslinking agent.

In any one of the eleventh to fourteenth embodiments, the fifteenth embodiment may provide the method in which the crosslinking agent is at least one selected from the group consisting of divinyl sulfone (DVS), 1,4-butandiol diglycidyl ether (BDDE), ethylene glycol diglycidyl ether (EGDGE), 1-(2,3-epoxypropyl)-2,3-epoxycyclohexane, polyethylene glycol diglycidyl Ether (PEGDE), 1,2-ethandiol diglycidyl ether, and sodium trimetaphosphate (STMP).

In any one of the eleventh to fifteenth embodiments, the sixth embodiment may provide the method in which the crosslinked hyaluronic acid or salt thereof has a weight average molecular weight of 100 to 5,000 kDa.

In any one of the eleventh to sixteenth embodiments, the seventeenth embodiment may provide the method in which the particle size distribution is measured using a Mastersizer 2000 from Malvern.

In any one of the eleventh to seventeenth embodiments, the eighteenth embodiment may provide the method in which the composition is a cosmetic composition.

In any one of the eleventh to eighteenth embodiments, the nineteenth embodiment may provide the method in which the composition is a pharmaceutical composition.

What is claimed is:

1. An oil-in-water composition for skin external application, comprising:
   a gel particle of crosslinked hyaluronic acid or a salt thereof having a particle size distribution with D (0.5) of 30 to 150 μm in an aqueous phase; and
   an emulsion particle having a particle size distribution with D(0.5) of 0.001 to 30 μm in an oil phase,
   wherein the emulsion particle comprises an oil selected from methyl trimethicone or squalane,
   wherein the composition comprises cetearyl alcohol, polyglyceryl-3 methylglucose distearate, glyceryl stearate citrate, and a hydroxyethyl acrylate/sodium acryloyldimethyl taurate copolymer,
   wherein the oil-in-water composition has a modulus of elasticity (G') of 300 to 9000 Pa,
   wherein the composition comprises the gel particle of crosslinked hyaluronic acid or a salt thereof in an amount of 0.01 to 1% by weight based on a total weight of the composition,
   wherein the composition has a sherbet texture, and
   wherein the crosslinked hyaluronic acid or salt thereof is chemically crosslinked by a crosslinking agent, and the crosslinking agent is 1,4-butandiol diglycidyl ether (BDDE), ethylene glycol diglycidyl ether (EGDGE) or sodium trimetaphosphate (STMP).

2. The composition of claim 1, wherein the emulsion particle has the particle size distribution with the D (0.5) of 0.1 to 10 μm.

3. The composition of claim 1, wherein the crosslinked hyaluronic acid or salt thereof has a weight average molecular weight of 100 to 5,000 kDa.

4. The composition of claim 1,
   wherein the gel particle of crosslinked hyaluronic acid or the salt thereof has particle size distribution with D (0.5) of 50 to 150 μm in the aqueous phase.

5. The composition of claim 1, wherein the composition is for moisturizing a skin.

6. The composition of claim 1, wherein the composition is a cosmetic composition.

7. A method for moisturizing a skin, comprising applying an effective amount of the oil-in-water composition of claim 1 to a skin of a subject in need thereof.

8. The method of claim 7, wherein the emulsion particle has the particle size distribution with the D (0.5) of 0.1 to 10 μm.

9. The method of claim 7, wherein the crosslinked hyaluronic acid or salt thereof has a weight average molecular weight of 100 to 5,000 kDa.

10. The method of claim 7, wherein the composition is a cosmetic composition.

11. The method of claim 7, wherein the composition is a pharmaceutical composition.

* * * * *